United States Patent
Wang (10) Patent No.: US 7,270,746 B2
(45) Date of Patent: Sep. 18, 2007

(54) WATER TREATMENT SYSTEM FOR WATER ANIMAL FEEDING FACILITY

(76) Inventor: Henry Wang, 256 S. Wilton Pl., Los Angeles, CA (US) 90004

( * ) Notice: Subject to any disclaimer, the term of this patent is extended or adjusted under 35 U.S.C. 154(b) by 315 days.

(21) Appl. No.: 11/084,532

(22) Filed: Mar. 18, 2005

(65) Prior Publication Data

US 2006/0207933 A1    Sep. 21, 2006

(51) Int. Cl.
   *B01D 29/62*    (2006.01)

(52) U.S. Cl. .............. 210/110; 210/120; 210/137; 210/143; 210/512.1; 210/533

(58) Field of Classification Search .............. 210/110, 210/120, 137, 143, 512.1, 533

See application file for complete search history.

(56) References Cited

U.S. PATENT DOCUMENTS

2003/0094421 A1 *   5/2003   Gargas .................. 210/760

* cited by examiner

*Primary Examiner*—Chester T. Barry
(74) *Attorney, Agent, or Firm*—Raymond Y. Chan; David and Raymond Patent Group (57) ABSTRACT

A water treatment system includes a waste collection arrangement and a waste disposal arrangement. The waste collection arrangement is disposed in a pond for swirling the water to form a funnel-shaped water vortex so as to collect a waste contained in the water of the pond at a base of the water vortex. The waste disposal arrangement has an outlet positioned at a base of the water vortex pattern of the water, and includes a suction pipe upwardly extended from the outlet at a position above a water level of the water in the pond, wherein the suction pipe is adapted for guiding air to suck into the outlet to create a suction effect at the outlet, such that the waste disposal arrangement is adapted for sucking the water at the base of the water vortex so as to discharge the waste out of the pond via the outlet.

25 Claims, 7 Drawing Sheets

WATER TREATMENT SYSTEM FOR WATER ANIMAL FEEDING FACILITY

BACKGROUND OF THE PRESENT INVENTION

1. Field of Invention

The present invention relates to a water treatment system, and more particularly to a water treatment system for a water animal feeding facility wherein the water treatment system is adapted to efficiently and effectively discharge aquatic waste, facilitate air exchange of water, and filter unwanted substances contained in the water for recycling use.

2. Description of Related Arts

A conventional water animal feed facility for commercial purposes typically comprises a feeding pond containing a predetermined amount of water, an air supply device provided in the feeding pond to mix the water with air so as to provide enough oxygen to the water animal which is being fed in the feeding pond, and a water filter arrangement communicating with the feeding pond to filter aquatic waste in the water so as to keep the water in the feeding pond clean. In order to nurture, for examples, fishes in the feeding pond for commercial purposes, the water, the air supply device and the water filter arrangement must be of high quality so as to create the best aquatic environment in the feeding pond.

However, there exist several problems for this kind of conventional water animal feeding facility. First, the water filter arrangement tends to be ineffective and inefficient. As a matter of fact, the feeding pond usually has a plurality of water outlets spacedly formed at the sidewalls thereof wherein water is pumped through the water outlets for extensive filtering. The filtered water is then pumped back into the feeding pond for recycling use. A major problem for this water filter arrangement is that the rate of filtering of water with respect to every point of the feeding pond is non-uniform so that there exist some portions, particularly the corner portions, of the feeding pond the water contained therein cannot be filtered effectively. As a result, the water contained in the feeding pond cannot be filtered uniformly so as to affect the filter performance of the water filtering system as a whole. Aquatic waste tends to remain at the corner portions of the feeding pond so as to adversely affect the health of the fishes at those portions. One way of remedying this problem is to increase the pumping power of the water filter arrangement so as to create turbulence within the feeding pond for drawing larger amount of water at a specified unit of time. However, this inevitably increases the energy consumption of the water filter arrangement and therefore increases the cost for feeding the fishes.

Secondly, there exits a common phenomenon that for a typical feeding pond, the fishes tend to stay at a position near the water surface. This may be explained by the fishes' desire to obtain more oxygen and food which are normally concentrated near the water surface. As a result, those staying at the bottom part of the feeding pond would have less nutrients as well as oxygen supply. Therefore, they may not growth at a satisfactory rate or have health problems. Moreover, if a substantial number of fishes stay at the upper portion of the feeding pond, other parts of the feeding pond is essentially wasted because they simply cannot nurture fishes of satisfactory quality.

Thirdly, since all of the fishes fed in the feeding pond are the subject of business transactions, users tend to put as many fishes as possible in a particular feeding pond so as to generate more sales and minimize waste of resources. As a result, most feeding ponds are extremely packed with fishes so that they don't have much space to move in the water. The long term consequence of this is that the fishes do not have enough exercise to build up their muscles and strength. This may be commercially undesirable because consumers usually prefer stronger fishes for better muscle texture, and more importantly, better taste.

Fourthly, the air supply device usually comprises a pump for injecting air bubbles into the water so as to mix the air with the water. This requires a considerable amount of energy. Moreover, it is difficult to guide the air bubbles to distribute evenly within the feeding pond and, as a result, some fishes may not get enough oxygen even for survival. In the long term, the death rate of the fishes will increase and for those surviving fishes, their health may not be in good condition.

Fifthly, it is well known in the art that aquatic waste, such as fish's feces, would produce unwanted chemicals, such as ammonia, which cause harmful effect to the fishes in the pond. As a result, conventional filtering systems are devoted to filter these aquatic wastes. However, conventional filtering systems usually draw water from the pond and guide it to flow into several filter layers for blocking the unwanted aquatic waste. Filtered water is then driven to flow back to the pond for recycling use. As a result, if the filtering systems have poor effectiveness or efficiency, the unwanted chemicals would accumulate in the pond so as to adversely affect the health of the fishes. As a matter of fact, if the ammonia concentration in the fish pond is larger than 4 ppm, the fishes may die as a result.

SUMMARY OF THE PRESENT INVENTION

A main object of the present invention is to provide a water treatment system for a water animal feeding facility wherein the water treatment system is adapted to efficiently and effectively discharge aquatic waste, facilitate air exchange of water, and filter unwanted substances contained in the water for recycling use.

Another object of the present invention is to provide a water treatment system for a water animal feeding facility, wherein the water treatment system comprises a waste collection arrangement which e capable of guiding aquatic waste contained in a pond to displace into a particular portion thereof for being discharged by a waste disposal arrangement utilizing siphon effect.

Another object of the present invention is to provide a water treatment system for a water animal feeding facility, wherein the waste collection arrangement comprises a plurality of air mixer units which mixes air with water which is to be uniformly discharged to the pond, wherein each of the air mixers utilizes natural phenomenon, notably siphon effect for drawing air to mix with the water so as to minimize the need for pumping devices of the present invention. In other words, the present invention minimizes the cost of running the water animal feeding facility by replacing electrically-operated pumps with natural energy.

Another object of the present invention is to provide a water treatment system for a water animal feeding facility, wherein the water treatment system comprises a water filter arrangement provided at the corner portions of the pond so as to eliminate the above-mentioned problems encountered at the corner portions of the conventional pond, while fully utilizing the space of the pond for performing water animal feeding activities (no extra space is required). In other words, present invention minimizes the space required for feeding water animals, such as fishes.

Another object of the present invention is to provide a water treatment system for a water animal feeding facility, wherein the water treatment does not involves any complicated or expensive equipments so as to minimize the manufacturing and the running cost of the present invention.

Another object of the present invention is to provide a water treatment system which discharges, rather than filters, aquatic waste from the pond so as to minimize any unwanted chemical substances which might arise from the pond. In other words, the present invention minimizes the chance of chemical poisoning by the fishes in the pond.

Another object of the present invention is to provide a method of disposing aquatic waste from a pond by natural guiding force and siphon effect without substantially relying on pumping devices.

Another object of the present invention is to provide a method of mixing air with water in the pond by siphon effect without substantially utilizing pumping devices.

In order to accomplish the above objects, the present invention provides a water treatment system for a water animal feeding facility comprising a pond containing water, wherein the water treatment system comprises:

a waste collection arrangement disposed in the pond for generating a centripetal force within the pond to centripetally collect a waste contained in the water of the pond; and a waste disposal arrangement which has an outlet in the pond and comprises a suction pipe upwardly extended from the outlet at a position above a water level of the water in the pond, and a control valve operatively provided at the outlet to generate a pressure difference at the outlet with respect to an atmosphere pressure through the suction pipe when the control valve is shut off, wherein when the control valve is actuated to open, the suction pipe is adapted for guiding air to flow into the outlet, such that the waste disposal arrangement is adapted for flushing the water by means of air pressure and water pressure so as to discharge the waste out of the pond via the outlet.

Moreover, the present invention provides a method of treating water for a water animal feeding facility which comprises a pond, wherein the method comprises the steps of:

(a) generating a centripetal force within the pond to centripetally collect aquatic waste in the water of the pond;

(b) providing an outlet in the pond and a control valve at the outlet to generate a pressure difference at the outlet with respect to an atmosphere pressure when the control valve is shut off; and (c) guiding a flow of air into the outlet, wherein when the control valve is actuated to open, the air is guided to flow into the outlet to carry the aquatic waste rapidly flowing into the outlet by means of air pressure and water pressure, so as to flush the aquatic waste at outlet for discharging the aquatic waste out of the pond.

These and other objectives, features, and advantages of the present invention will become apparent from the following detailed description, the accompanying drawings, and the appended claims.

DETAILED DESCRIPTION OF THE PREFERRED EMBODIMENT

Figure 1:
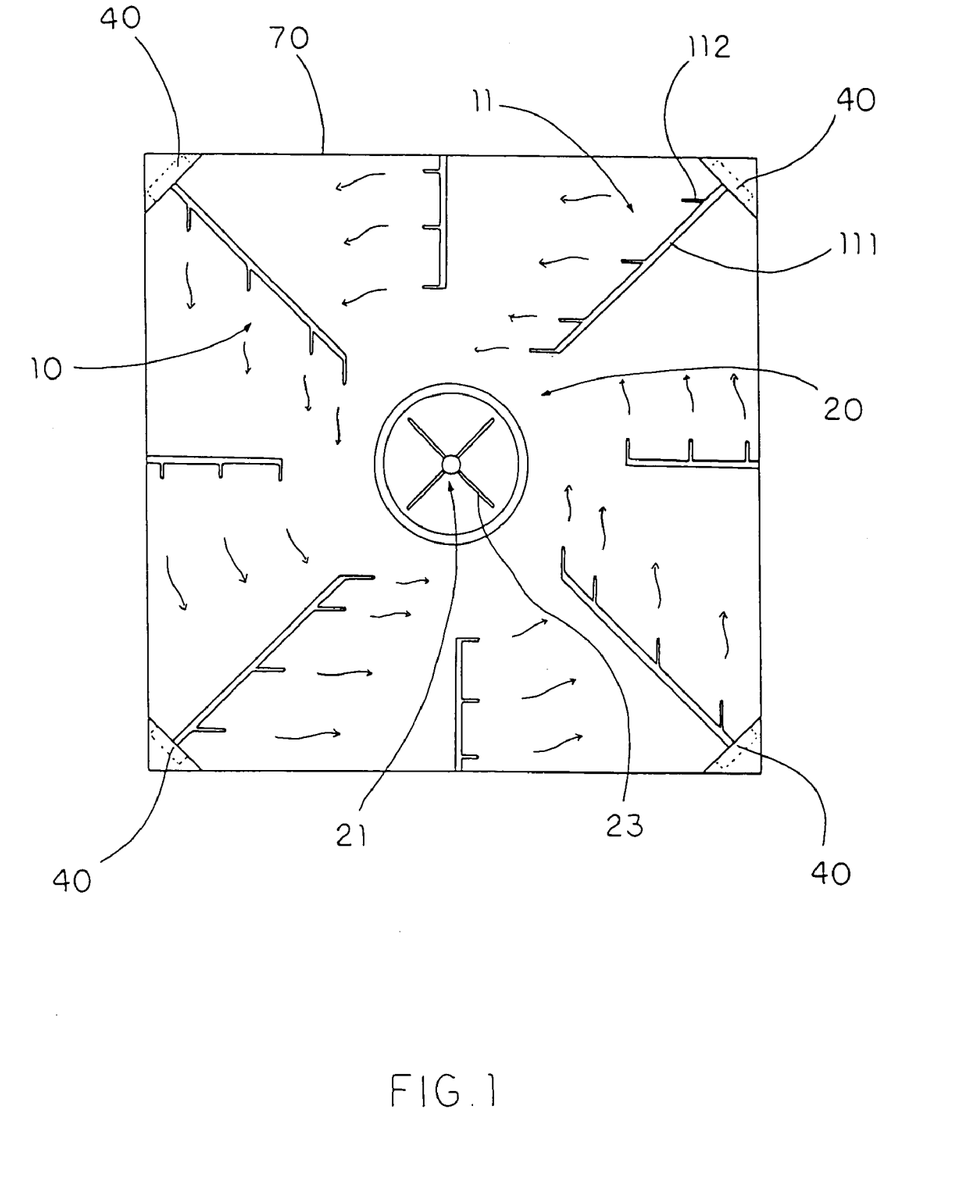
FIG. 1 is a schematic diagram of a water treatment system according to a preferred embodiment of the present invention.
Figure 2:
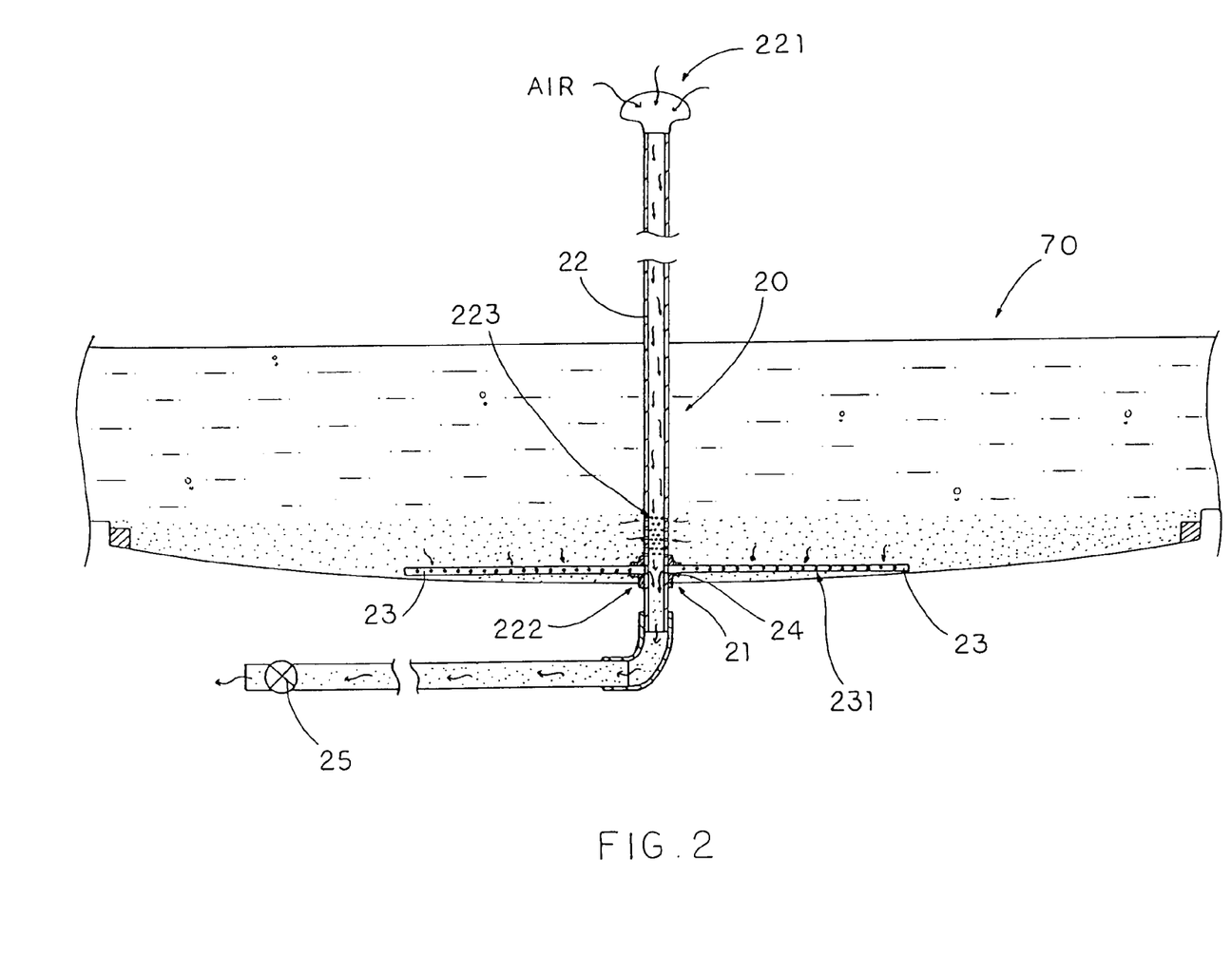
FIG. 2 is a side view of a waste disposal arrangement of the water treatment system according to the above preferred embodiment of the present invention.

Referring to FIG. 1 and FIG. 2 of the drawings, a water treatment system according to a preferred embodiment of the present invention is illustrated. The water treatment system, which is provided for a water animal feeding facility comprising a pond 70 containing a predetermined amount of water, comprises a waste collection arrangement 10 and a waste disposal arrangement 20.

The waste collection arrangement 10 is disposed in the pond 70 for generating a centripetal force within the pond 70 to centripetally collect waste contained in the water of the pond 70. More specifically, the waste collection arrangement 10 is disposed in the pond 70 for swirling the water to form a funnel-shaped water vortex so as to collect waste contained in the water of the pond 70 at a base of the water vortex.

The waste disposal arrangement 20 has an outlet 21 positioned in the pond 70, and comprises a suction pipe 22 upwardly extended from the outlet 21 at a position above a water level of the water in the pond 70, and a control valve 25 operatively provided at the outlet to generate a pressure difference at the outlet 21 with respect to the atmospheric pressure through the suction pipe 22 when the control valve 25 is shut off, wherein when the control valve 25 is actuated to open, the suction pipe 22 is adapted for guiding air to flow into the outlet 21, such that the waste disposal arrangement 20 is adapted for flushing the water by means of air pressure and water pressure so as to discharge the waste out of the pond 70 via the outlet 21.

Accordingly, the waste disposal arrangement 20 has an outlet 21 positioned at a base of the water vortex of the water, and comprising a suction pipe 22 upwardly extended from the outlet 21 at a position above a water level of the water in the pond 70, wherein the suction pipe 22 is adapted for guiding air sucking into the outlet 21 to create a suction effect at the outlet 21, such that the waste disposal arrangement 20 is adapted for sucking the water at the base of the water vortex so as to discharge the waste out of the pond 70 via the outlet 21 when the water control valve 25 is opened.

The waste collection arrangement 10 comprises a plurality of vortex generation units 11 centripetally extended from a plurality of corner portions of the pond 70 respectively to guide a flow of water at a tangential direction within the pond 70 so as to create the funnel-shaped water vortex about the outlet 21 by the tangential flow of water. Consequently, waste contained in the pond 70 will be driven by the water vortex to move towards the base thereof so as to be collected at the outlet 21 of the waste disposal arrangement 20.

More specifically, each of the vortex generation units 11 comprises a main circulation pipe 111 inwardly extended from the respective corner portion of the pond to a center thereof, and a plurality of vortex pipes 112 transversely and spacedly extended from the main circulation pipe 111 at a tangential direction with respect to the outlet 21 of the waste disposal arrangement 20, wherein water is directed to flow from the respective corner portion of the pond 70 to pass through the main circulation pipe 111 which then guides the water flowing therethrough to flow into the vortex pipes 112 for discharging into the pond at the tangential direction so as to create the water vortex within the pond 70 for swirling the water to collect the waste at a base of the water vortex.

It is worth mentioning that by creating the water vortex within the pond 70, the water animals, such as the fishes, fed in the pond 70 are subject to continuous flow of water as created by the water vortex, so that the water animals are required to resist the continuous flow of water so as to avoid them being driven along the water vortex. Therefore, the water animals are continuously kept to exercise without moving so as to optimally develop their muscles as well as body strength. Since the water animals do not need to move in order to exercise, the number of, say, fishes, which can be fed in the pond 70 can be increased substantially without deteriorating the quality of their body conditions.

The suction pipe 22 of the waste disposal arrangement 20 has a top suction end 221, a bottom discharge end 222 connecting with the outlet 21, and a plurality of collection holes 223 formed at a circumferential wall of a body portion of the suction pipe 22 which immerses in the water of the pond 70, such that water in the pond 70 is allowed to pass through the collection holes 223 to be discharged at the outlet 21.

It is worth mentioning that each of the collection holes 223 has a predetermined diameter solely for allowing waste of the corresponding size to pass therethrough, such that only waste of particular diameter is allowed to be discharged at the outlet 22 via the collection holes 223. According to the preferred embodiment of the present invention, the waste disposal arrangement 20 is adapted for discharging aquatic waste of larger size, such as feces of fishes, so as to allow feces to be discharged at the outlet 21 through the collection holes 223.

Referring to FIG. 1 to FIG. 2 of the drawings, the waste disposal arrangement 20 further comprises a plurality of extension pipes 23 outwardly and radially extended from the suction pipe 22 to the pond 70, wherein each of the extension pipes 23 has a plurality of gathering holes 231 formed thereon to allow water passing therethrough to flow into the suction pipe 22 and discharge at the outlet 21.

In other words, the waste disposal arrangement 20 is positioned at the center of the water vortex such that the aquatic waste is naturally carried by the water vortex to flow into the center portion of the pond 70 and collected at the suction pipe 22 or the extension pipes 23. Accordingly, a radially diameter of the waste disposal arrangement 20 is aligned with the base of the water vortex so that the aquatic waste is naturally carried by the vortex to be discharged by the waste disposal arrangement 20 without using any pumping devices.

According to the preferred embodiment of the present invention, the waste disposal arrangement 20 further comprises a piping base 24 connecting between the outlet 21 and the bottom discharge end 222 of the suction pipe 22, wherein each of the extension pipes 23 are radially and centripetally extended from the piping base 24 for collecting the aquatic waste in such a manner as mentioned above.

At this point, it is important to point out that since the suction pipe 22 is upwardly extended to air above the water level in the pond 70, when the aquatic waste is driven by the water vortex to flow through the suction pipe 22 via the collection holes 223 and the gathering holes 231, the fast flowing of water with the aquatic waste will create a siphon effect at the suction pipe 22 so as to allow the aquatic waste to be effectively sucked to the outlet 21. Thus, the electric energy required for collecting and sucking the aquatic waste could be minimized with the help of naturally occurred siphon effect. Of course, one may install a pumping device to communicate with the outlet 21 for further enhancing the suction of aquatic waste, nevertheless, it would require less energy as compared with conventional pumping systems of conventional water treatment systems which do not utilize siphon effect.

Figure 3:
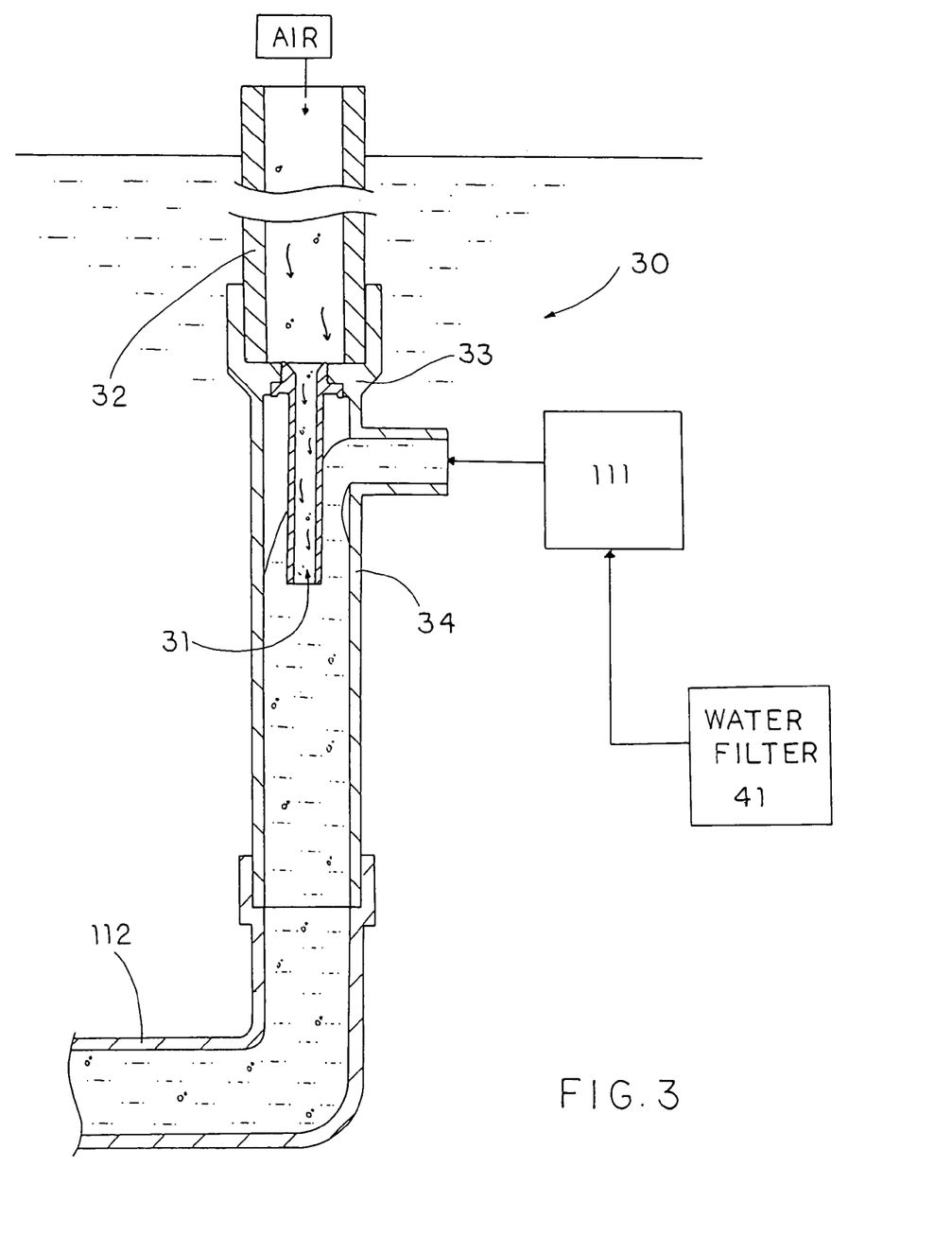
FIG. 3 is a sectional side view of an air mixer arrangement of the water treatment system according to the above preferred embodiment of the present invention.

Referring to FIG. 1 to FIG. 3 of the drawings, the water treatment system further comprises an air mixer arrangement 30 provided in the pond 70 to mix air with the water therein so as to supply air to the water animals living in the pond 70. In particular, the air mixer arrangement 30 is communicated with the waste collection arrangement 10 for suction of air by siphon effect so as to mix air with the water which creates the water vortex, such that when water is discharged through the vortex pipe 112, air is mixed with the water to nurture the pond 70 with sufficient amount of air, i.e. oxygen.

More specifically, as shown in FIG. 3 of the drawings, the air mixer arrangement 30 comprises a plurality of air mixer pipes 34 extended to respective vortex pipes 112, and a plurality of ventilating pipes 32 extended from the respective air mixer pipes 34 to a position above the water level for guiding air into the corresponding air mixer pipe 34 to mix with the water therein so as to enhance an oxygen level of the water when the water flows into the pond 70 via the corresponding vortex pipe 112.

More specifically, as shown in FIG. 3 of the drawings, the air mixer arrangement 30 has a plurality of contracted water channels 31 formed in the ventilating pipes 32 respectively to increase a flow rate of the air flowing therethrough. Consequently, when water flows into the air mixer pipes 34, it will mix with the air coming out of the air ventilating pipes 32 and creates a siphon effect for rapidly drawing air into the air mixer pipes 34 for increasing the oxygen level in the water. The water is then rapidly discharged to the pond 70 via the vortex pipes 112 for creating the water vortex in the manner as mentioned above. In other words, a portion of the ventilating pipe 32 has a diameter substantially smaller than a diameter of the air mixer pipe 34 for increasing a flow rate of the air flowing thereinto so as to rapidly draw the air into the air mixer pipe to mix with the water.

According to the preferred embodiment of the present invention, each of the ventilating pipes 32 has a contracting divider 33 for forming the contracted water channel 31 within the ventilating pipe 32. As mentioned earlier, the ventilating pipe 34 is upwardly extended to a position above the water surface for drawing air thereinto. It is worth mentioning that the ventilating pipe 32 may be integrally extended from the respective air mixer pipe 34, or alternatively, as shown in FIG. 3 of the drawings, the ventilating pipe 32 and the air mixer pipe 34 forms two distinct elements of the present invention.

Figure 4:
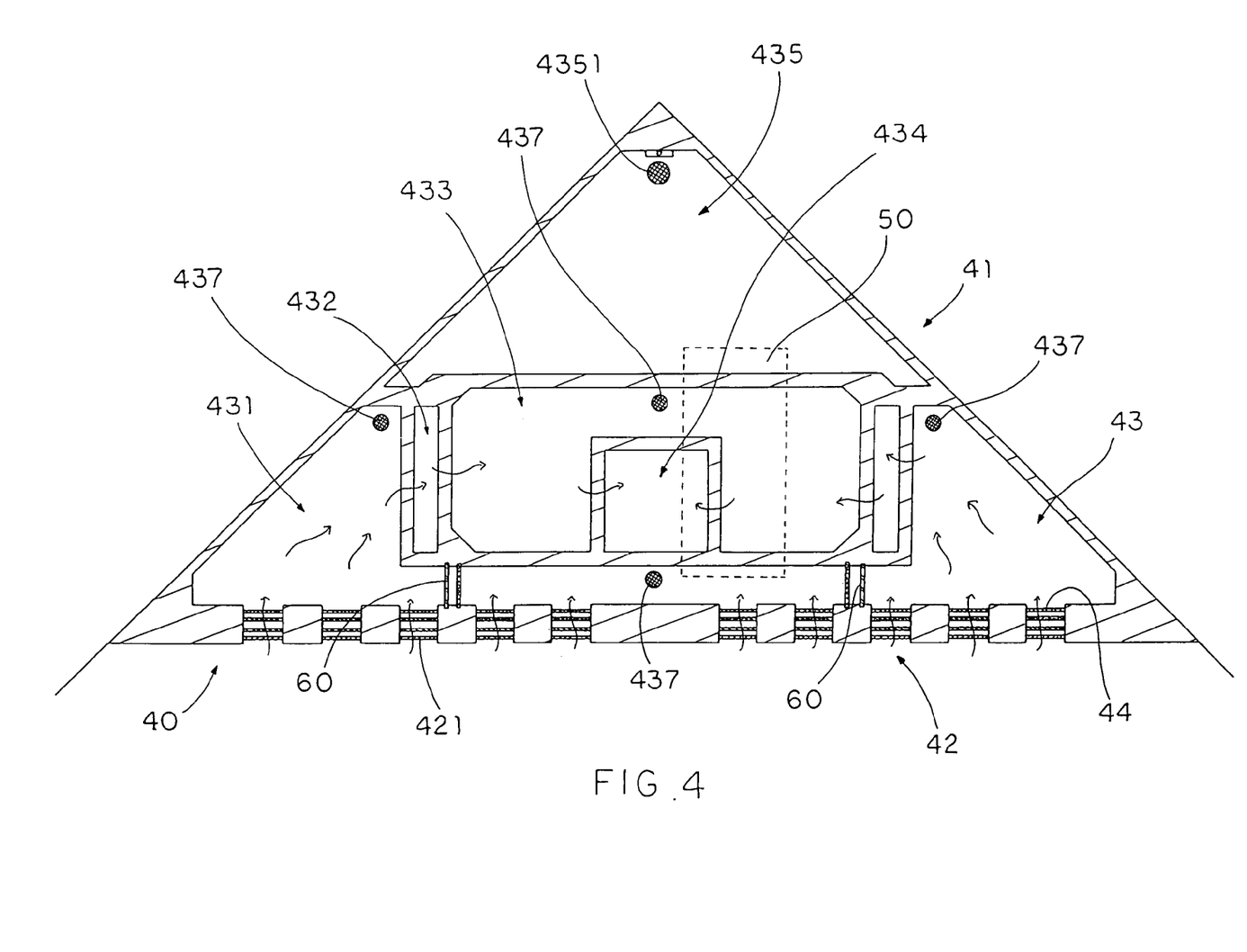
FIG. 4 is a schematic diagram of the water filter arrangement according to the above preferred embodiment of the present invention.

Referring to FIG. 4 of the drawings, the water treatment system further comprises a water filter arrangement 40 comprising a plurality of water filters 41 provided at the corner portions of the pond 70 to filter water in the pond 70 so as to ensure maximum cleanness of the water for creating an optimal aquatic environment for the water animals.

Each of the water filters 41 comprises a grating arrangement 42 and a water purifier 43 communicating with the grating arrangement 42 in such a manner that water in the pond is first guided to pass through the grating arrangement 42 for blocking larger dirt particles such as aquatic plant residues or soil particles, and the driven to pass through the water purifier 43 for chemically filtering smaller unwanted particles such as ammonia or other harmful substances adversely affecting the water animals.

In particular, the grating arrangement 42 comprises a plurality of filter gratings 421 which are adapted for physically blocking unwanted particles of differing sizes. For instances, the grating arrangement 42 may be embodied as comprising three filter gratings 421, wherein the outermost layer of filter gratings 421 may be embodied as a metallic net for blocking such large dirt particles as aquatic plants; the middle layer of the filter gratings 421 may be embodied as a conventional matala filter; the innermost layer of the filter gratings 421 may be embodied as a stopper filter adapted for blocking particles of finer sizes.

On the other hand, as shown in FIG. 4 of the drawings, the water purifier 43 is disposed at one of the corner portions of the pond 70 to define a plurality of filtering compartments, namely a charcoal compartment 431, an air mixer compartment 432, a main filtering compartment 433, and a water discharge compartment 434, arranged in a side-by-side manner, wherein water passing through the grating arrangement 42 is guided to pass through the charcoal compartment 431, the air mixer compartment 432, the main filtering compartment 433 and the water discharge compartment 434 for extensive filtering before being pumped to flow back into the pond 70.

Figure 5:
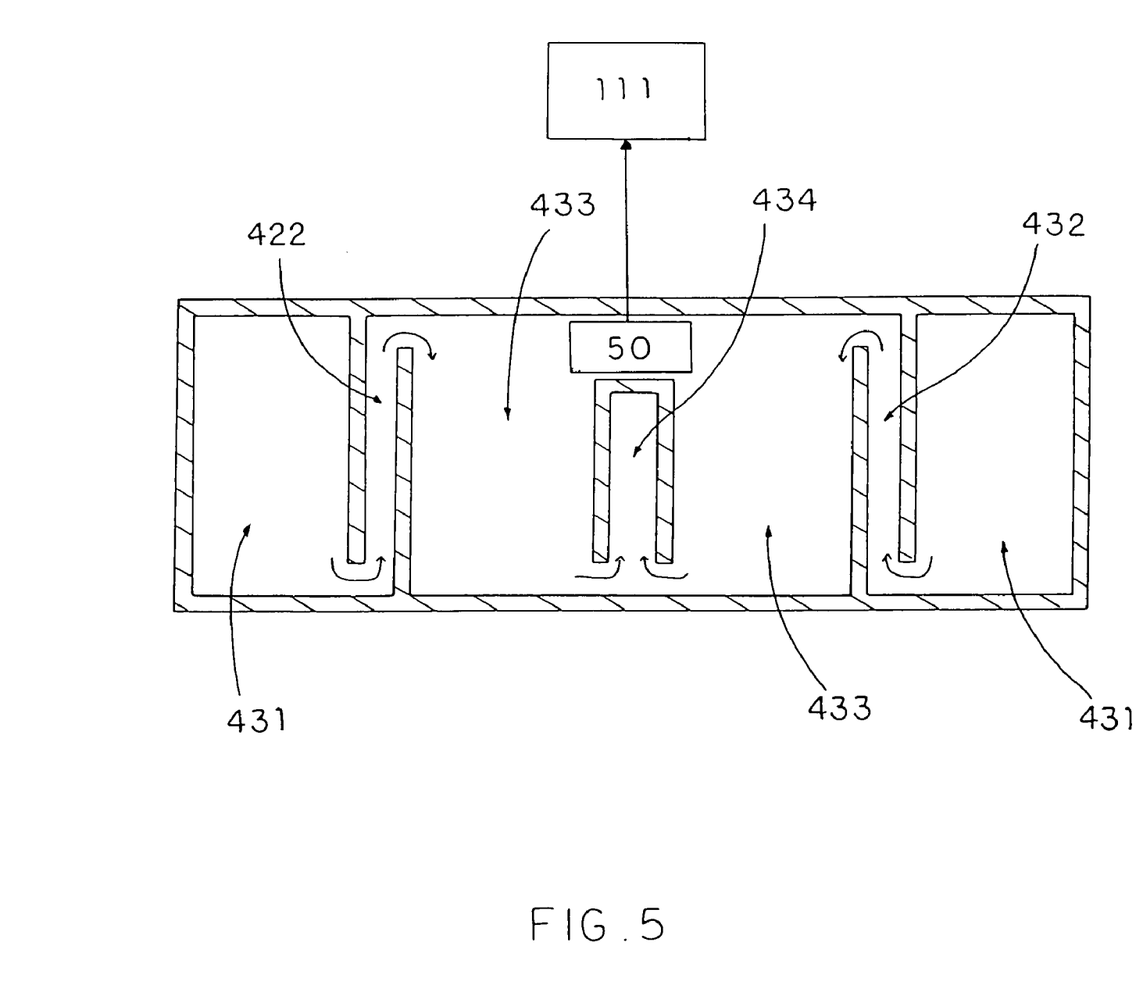
FIG. 5 is a sectional side view of the water filter arrangement according to the above preferred embodiment of the present invention.

Referring to FIG. 4 to FIG. 5 of the drawings, the charcoal compartment 431, which is communicated with the grating arrangement 42, contains a predetermined amount of charcoal for absorbing odorous, colored substance or organic chemicals present in the water. When water in the pond 70 is guided to enter the charcoal compartment 431, it fills up the charcoal compartment 431 and passes to the air mixer compartment 432 through a bottom passing channel formed on a corresponding sidewall of the charcoal compartment. The air mixer compartment 432 is then filled up with water which is guided to flow into the main filtering compartment 433 on top of a corresponding sidewall of the air mixer compartment 432 as to create a waterfall at the main filtering compartment 433 for mixing the water with a predetermined amount of air. The air mixer compartment 432 contains a predetermined amount of chemical filter materials adapted for absorbing such unwanted chemicals as ammonia or carbon dioxide. The water is then guided to the water discharge compartment 434 where it is pumped out of the water purifier 43 to flow back into the pond 70.

According to the preferred embodiment of the present invention, the main circulation pipes 111 are connected with the corresponding water discharge compartment 434 in such a manner that the filtered water is recycled and guided to flow into the vortex generation unit 11 for creating the water vortex in such a manner as mentioned above.

Consequently, it is worth mentioning that the above-mentioned water filter arrangement 40 assist in mixing air with the water so as to further enhance air-water mixing for supplying air to the water animals in the pond 70.

In this regards, it is important to point out that the water treatment system further comprises a water pumping device 50 communicating the water filter arrangement 40 with the pond 70 in such a manner that filtered water is pumped from the water discharge compartment 434 to the main circulation pipe 111 for creating the water flow to form the water vortex at the pond, as in the manner mentioned above.

Referring to FIG. 4 of the drawings, in order to facilitate convenient utilization of the present invention, the water treatment system further comprises a plurality of control gates 60 operatively provided at the filtering compartments 431, 432, 433, 434 respectively for blocking the water entering into the filter compartments 431, 432, 433, 434 such that each of the filter compartments 431, 432, 433, 434 is adapted for individually draining out the water therein for cleaning purpose when the respective control gate 60 is closed.

As a result, the water purifier 43 further has a sewage collection compartment 435, having a main discharge outlet 4351, adapted to be selectively opened and formed therein for connecting with an external discharge pipe, communicating with each of the charcoal compartment 431, air mixer compartment 432, main filtering compartment 433, and the water discharge compartment 434, wherein water from these compartments is allowed to be controllably discharged to the sewage collection compartment 435 via respective drainage outlets 437. The water is then discharged through the main discharge outlet 4351. Accordingly, the charcoal compartment 431, the air mixer compartment 432, the main filtering compartment 433, and the water discharge compartment 434 are adapted to be individually cleaned by discharging water to the sewage collection compartment 435.

Moreover, it is also worth mentioning that, according to the preferred embodiment of the present invention, the outlet 21 of the water disposal system 20 is connected to the sewage collection compartment 435 so that the waste discharged through the outlet 21 is temporarily collected at the sewage collection compartment 435 for periodically discharging via the main discharge outlet 4351. As a result, the user of the present invention is able to selective control discharge of waste of the pond 70 by controlling the opening of the control valve 25 and the discharge of main discharging outlet 4351.

The water filter arrangement 40 further comprises a plurality of water gates 44 movably provided in front of the water filters 41 respectively to selectively allow water flowing into the respective water filter 41. In other words, when the water gates 44 are closed, water is blocking from flowing into the water filters 41, while when the water gates 44 are opened, water is allowed to flow from the pond 70 to the water filters 41.

Figure 6:
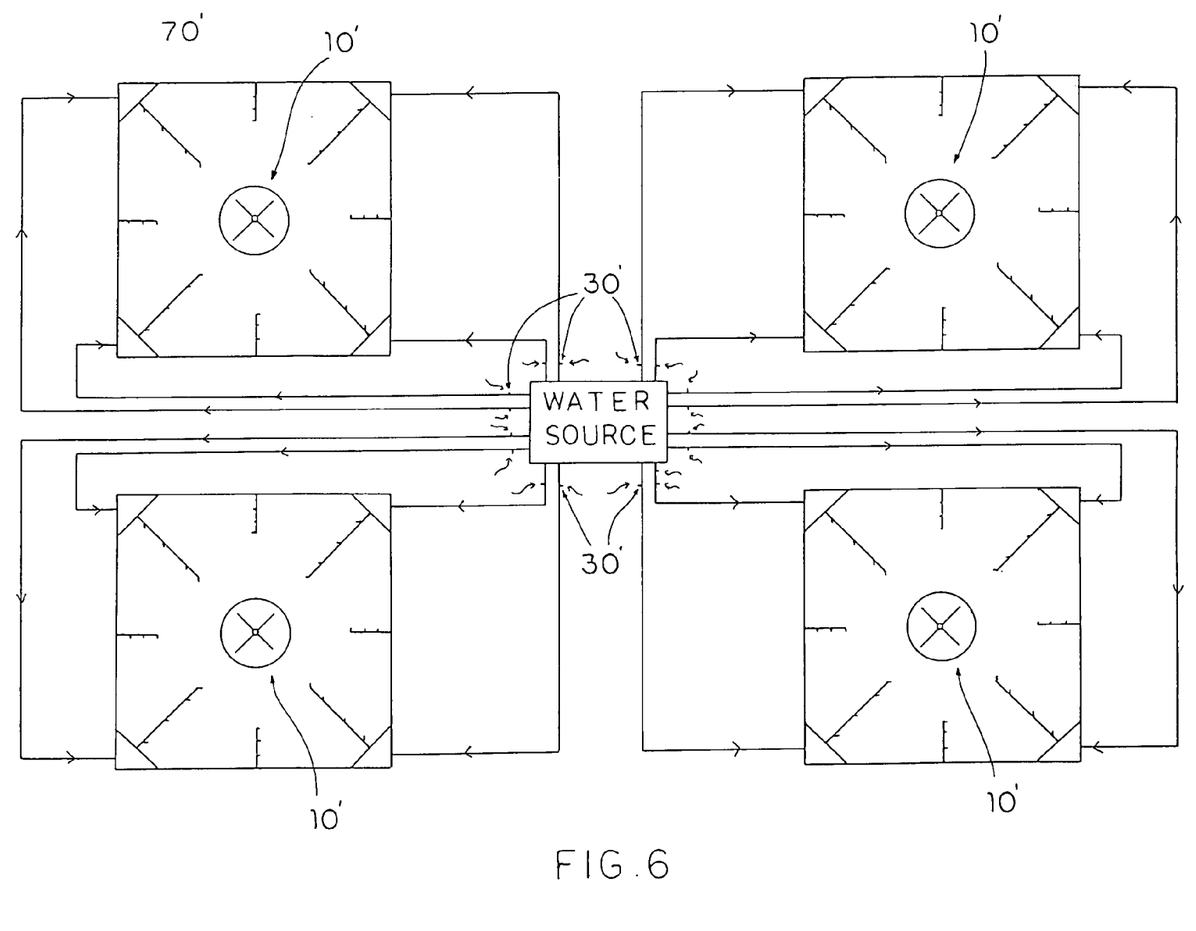
FIG. 6 is an alternative mode of the water treatment system according to the above preferred embodiment of the present invention.

Referring to FIG. 6 of the drawings, an alternative mode of the water treatment system according to the preferred embodiment of the present invention is illustrated. The alternative mode is similar to the preferred embodiment except the air mixer arrangement 30'. Specifically, the air mixer arrangement 30' is positioned out of the pond 70' so as to perform extended air-water mixing. The water then guided to flow back to the waste collection arrangement 10' for generating the water vortex. It is also worth mentioning that a common water source may be utilized to supply water to a plurality of ponds 70' for mixing water in those ponds 70' with air.

Figure 7:
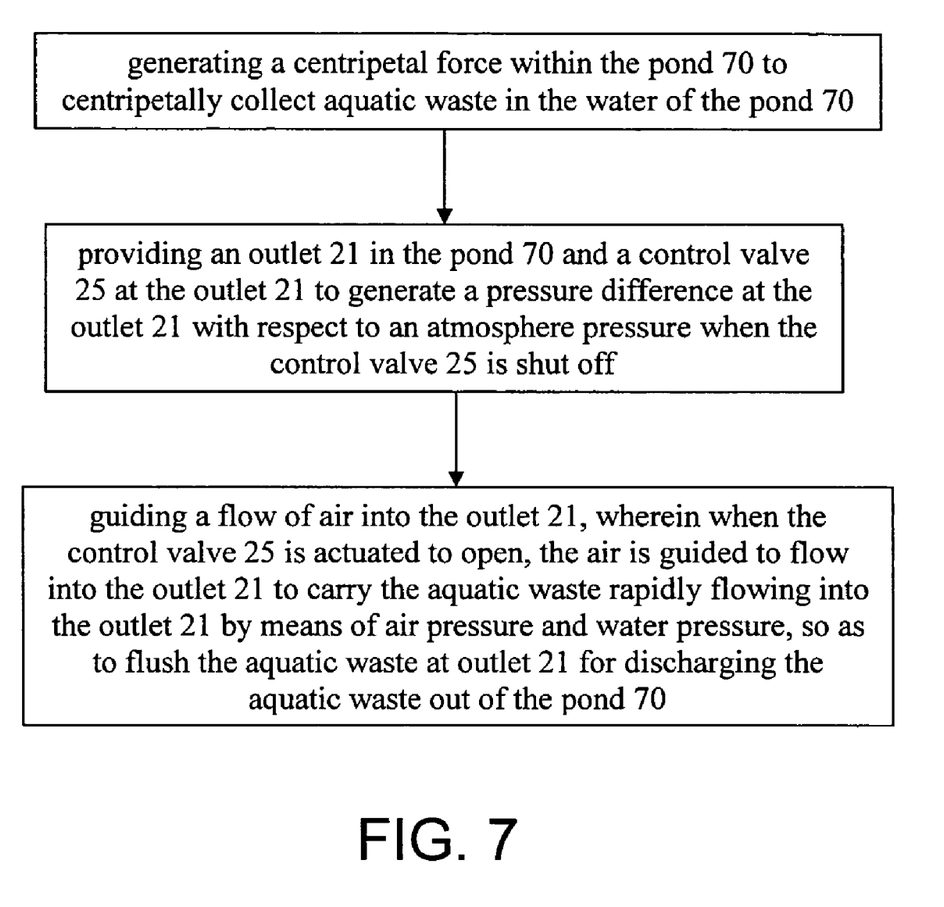
FIG. 7 is a flow diagram of a method of treating the water in a pond of an animal feeding facility according to the above preferred embodiment of the present invention.

Referring to FIG. 7 of the drawings, ad basing on the above disclosure, the present invention may also be embodied as a method of treating water for the water animal feeding facility which comprises the pond 70, wherein the method comprises the steps of:

(a) generating a centripetal force within the pond 70 to centripetally collect aquatic waste in the water of the pond 70;

(b) providing an outlet 21 in the pond 70 and a control valve 25 at the outlet 21 to generate a pressure difference at the outlet 21 with respect to an atmosphere pressure when the control valve 25 is shut off; and (c) guiding a flow of air into the outlet 21, wherein when the control valve 25 is actuated to open, the air is guided to flow into the outlet 21 to carry the aquatic waste rapidly flowing into the outlet 21 by means of air pressure and water pressure, so as to flush the aquatic waste at outlet 21 for discharging the aquatic waste out of the pond 70.

Step (a) comprises the steps of:

(a.1) directing the water flowing from a peripheral side of the pond 70 towards the outlet 21 through a main circulation pipe 111; and (a.2) directing the water to flow in the pond 70 at a tangential direction with respect to the outlet to create a water vortex through a plurality of vortex pipes 112 which are transversely and spacedly extended from the main circulation pipe 111.

Moreover, step (a) further comprises a step of sucking air into the vortex pipes 112 to mix with the water therein so as to enhance an oxygen level of the water when the water flows into the pond 70.

Moreover, the method of treating water further comprises, before step (a), the steps of:

physically blocking larger particles of the water by a grating arrangement 42 formed at one of a corner portion of the pond 70;

chemically filtering unwanted substances in the water by a water purifier 43 communicated with the grating arrangement 42; and directing the water into the pond 70 to create the water vortex therein.

From the forgoing descriptions, it can be shown that the above objects have been substantially achieved. The present invention effectively provides a water treatment system and method thereof which are adapted to efficiently and effectively discharge aquatic waste, facilitate air exchange of water, and filter unwanted substances contained in the water for recycling use.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A water treatment system for a water animal feeding facility comprising a pond containing water, wherein said water treatment system comprises:

a waste collection arrangement disposed in said pond for generating a centripetal force within said pond to centripetally collect a waste contained in said water of said pond; and a waste disposal arrangement which has an outlet in said pond and comprises a suction pipe upwardly extended from said outlet at a position above a water level of said water in said pond, and a control valve operatively provided at said outlet to generate a pressure difference at said outlet with respect to an atmosphere pressure through said suction pipe when said control valve is shut off, wherein when said control valve is actuated to open, said suction pipe is adapted for guiding air to flow into said outlet, such that said waste disposal arrangement is adapted for flushing said water by means of air pressure and water pressure so as to discharge said waste out of said pond via said outlet.

2. The water treatment system, as recited in claim 1, wherein said suction pipe of said waste disposal arrangement has a top suction end upwardly extended above said water level, a bottom discharge end connecting with said outlet, and a plurality of collection holes spacedly formed on a circumferential wall of said suction pipe at a position below said water level for allowing said water and said waste to be discharged at said outlet through said collection holes.

3. The water treatment system, as recited in claim 2, wherein said waste disposal arrangement further comprises a plurality of extension pipes outwardly and radially extended from said suction pipe to said pond, wherein each of said extension pipes has a plurality of gathering holes formed thereon for allowing said waste and said water passing therethrough to flow into said suction pipe and discharging at said outlet.

4. The water treatment system, as recited in claim 1, wherein said waste collection arrangement comprises a plurality of vortex generation units each of which comprises a main circulation pipe inwardly extended from a peripheral side of said pond towards said outlet, and a plurality of vortex pipes transversely and spacedly extended from said main circulation pipe at a tangential direction with respect to said outlet, wherein each of said vortex generation units is adapted for directing said water to flow along said vortex pipes through said respective main circulation pipe at said tangential direction of said outlet so as to create a water vortex at said pond for swirling said water to collect said waste at a base of said water vortex.

5. The water treatment system, as recited in claim 2, wherein said waste collection arrangement comprises a plurality of vortex generation units each of which comprises a main circulation pipe inwardly extended from a peripheral side of said pond towards said outlet, and a plurality of vortex pipes transversely and spacedly extended from said main circulation pipe at a tangential direction with respect to said outlet, wherein each of said vortex generation units is adapted for directing said water to flow along said vortex pipes through said respective main circulation pipe at said tangential direction of said outlet so as to create a water vortex at said pond for swirling said water to collect said waste at a base of said water vortex.

6. The water treatment system, as recited in claim 3, wherein said waste collection arrangement comprises a plurality of vortex generation units each of which comprises a main circulation pipe inwardly extended from a peripheral side of said pond towards said outlet, and a plurality of vortex pipes transversely and spacedly extended from said main circulation pipe at a tangential direction with respect to said outlet, wherein each of said vortex generation units is adapted for directing said water to flow along said vortex pipes through said respective main circulation pipe at said tangential direction of said outlet so as to create a water vortex at said pond for swirling said water to collect said waste at a base of said water vortex.

7. The water treatment system, as recited in claim 4, further comprising an air mixer arrangement which comprises an air mixer pipe extended to said pond and a ventilating pipe extended from said air mixer pipe to a position above said water level for guiding air into said air mixer pipe to mix with said water therein so as to enhance an oxygen level of said water when said water flows into said pond.

8. The water treatment system, as recited in claim 5, further comprising an air mixer arrangement which comprises an air mixer pipe extended to said pond and a ventilating pipe extended from said air mixer pipe to a position above said water level for guiding air into said air mixer pipe to mix with said water therein so as to enhance an oxygen level of said water when said water flows into said pond.

9. The water treatment system, as recited in claim 6, further comprising an air mixer arrangement which comprises an air mixer pipe extended to said pond and a ventilating pipe extended from said air mixer pipe to a position above said water level for guiding air into said air mixer pipe to mix with said water therein so as to enhance an oxygen level of said water when said water flows into said pond.

10. The water treatment system, as recited in claim 7, wherein said air mixer pipe is extended from one of said vortex pipes for directing said water from said vortex pipe into said pond, wherein said ventilating pipe extended from said air mixer pipe to a position above said water level for guiding said air into said air mixer pipe to mix with said water therein.

11. The water treatment system, as recited in claim 8, wherein said air mixer pipe is extended from one of said vortex pipes for directing said water from said vortex pipe into said pond, wherein said ventilating pipe extended from said air mixer pipe to a position above said water level for guiding said air into said air mixer pipe to mix with said water therein.

12. The water treatment system, as recited in claim 9, wherein said air mixer pipe is extended from one of said vortex pipes for directing said water from said vortex pipe into said pond, wherein said ventilating pipe extended from said air mixer pipe to a position above said water level for guiding said air into said air mixer pipe to mix with said water therein.

13. The water treatment system, as recited in claim 7, wherein a portion of said ventilating pipe, having a diameter substantially smaller than a diameter of said air mixer pipe, is extended into said air mixer for increasing a flow rate of said air flowing thereinto so as to rapidly draw said air into said air mixer pipe to mix with said water.

14. The water treatment system, as recited in claim 9, wherein a portion of said ventilating pipe, having a diameter substantially smaller than a diameter of said air mixer pipe, is extended into said air mixer for increasing a flow rate of said air flowing thereinto so as to rapidly draw said air into said air mixer pipe to mix with said water.

15. The water treatment system, as recited in claim 12, wherein a portion of said ventilating pipe, having a diameter substantially smaller than a diameter of said air mixer pipe, is extended into said air mixer for increasing a flow rate of said air flowing thereinto so as to rapidly draw said air into said air mixer pipe to mix with said water.

16. The water treatment system, as recited in claim 1, further comprising a plurality of water filters provided at corner portions of said pond respectively for filtering said water of said pond, wherein each of said water filters comprises a grating arrangement formed as a sidewall of said respective corner portion of said pond to physically block larger particles of said water, and a water purifier having a plurality of filtering compartments communicated with said grating arrangement for chemically filtering unwanted substances in said water.

17. The water treatment system, as recited in claim 6, further comprising a plurality of water filters provided at corner portions of said pond respectively for filtering said water of said pond, wherein each of said water filters comprises a grating arrangement formed as a sidewall of said respective corner portion of said pond to physically block larger particles of said water, and a water purifier having a plurality of filtering compartments communicated with said grating arrangement for chemically filtering unwanted substances in said water.

18. The water treatment system, as recited in claim 9, further comprising a plurality of water filters provided at corner portions of said pond respectively for filtering said water of said pond, wherein each of said water filters comprises a grating arrangement formed as a sidewall of said respective corner portion of said pond to physically block larger particles of said water, and a water purifier having a plurality of filtering compartments communicated with said grating arrangement for chemically filtering unwanted substances in said water.

19. The water treatment system, as recited in claim 15, further comprising a plurality of water filters provided at corner portions of said pond respectively for filtering said water of said pond, wherein each of said water filters comprises a grating arrangement formed as a sidewall of said respective corner portion of said pond to physically block larger particles of said water, and a water purifier having a plurality of filtering compartments communicated with said grating arrangement for chemically filtering unwanted substances in said water.

20. The water treatment system, as recited in claim 17, further comprising a plurality of control gates operatively provided at said filtering compartments respectively for blocking said water entering into said filter compartments such that each of said filter compartments is adapted for individually draining out said water therein when said respective control gate is closed.

21. The water treatment system, as recited in claim 18, further comprising a plurality of control gates operatively provided at said filtering compartments respectively for blocking said water entering into said filter compartments such that each of said filter compartments is adapted for individually draining out said water therein when said respective control gate is closed.

22. The water treatment system, as recited in claim 19, further comprising a plurality of control gates operatively provided at said filtering compartments respectively for blocking said water entering into said filter compartments such that each of said filter compartments is adapted for individually draining out said water therein when said respective control gate is closed.

23. The water treatment system, as recited in claim 20, further comprising a water pumping device communicatively connecting said water filters with said main circulation pipes respectively for pumping said filtered water back into said pond.

24. The water treatment system, as recited in claim 21, further comprising a water pumping device communicatively connecting said water filters with said main circulation pipes respectively for pumping said filtered water back into said pond.

25. The water treatment system, as recited in claim 22, further comprising a water pumping device communicatively connecting said water filters with said main circulation pipes respectively for pumping said filtered water back into said pond.

* * * * *